March 24, 1936.  L. C. VANDERLIP  2,034,931
LOCKING TANK CAP
Filed Aug. 31, 1933
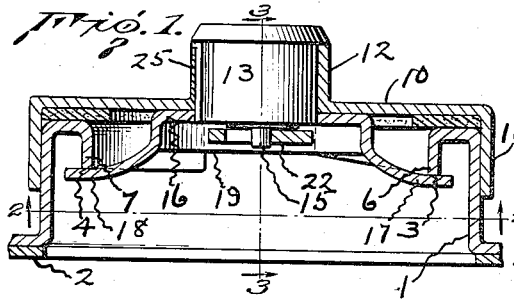
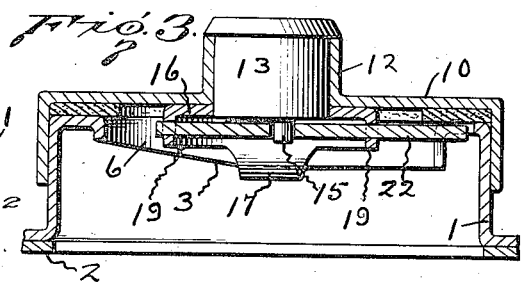
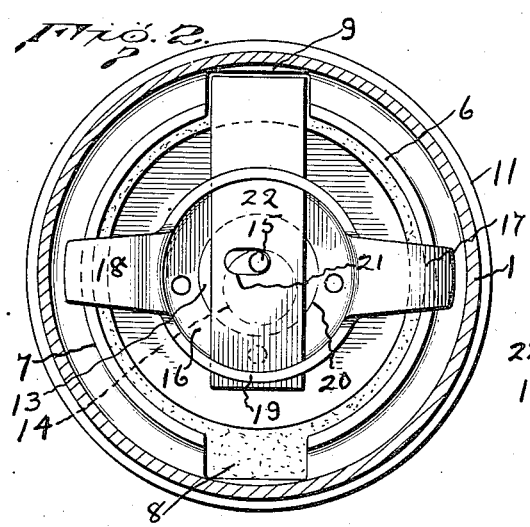
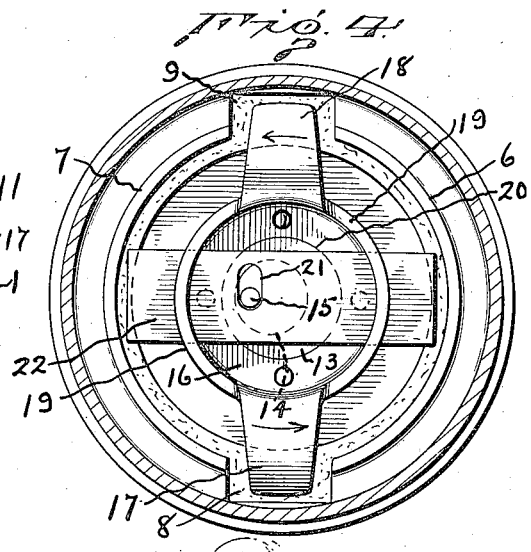
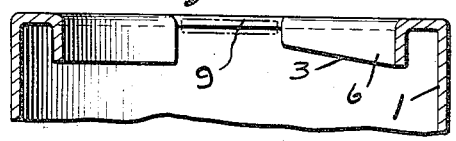
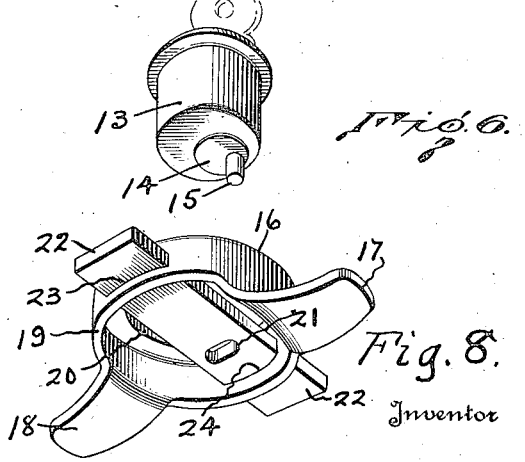
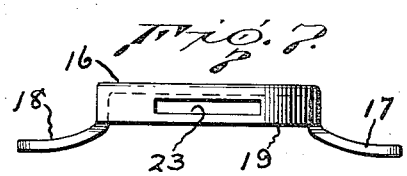
Louis C. Vanderlip,
Inventor Patented Mar. 24, 1936

2,034,931

UNITED STATES PATENT OFFICE 2,034,931

LOCKING TANK CAP

Louis C. Vanderlip, Elkhart, Ind.

Application August 31, 1933, Serial No. 687,665

5 Claims. (Cl. 70—90)

My invention relates to liquid fuel tanks, and especially to locking caps for the filler tube of fuel tanks.

The principal object of my invention is to provide an improved locking cap for the filler tube of liquid fuel tanks to prevent the theft of the fuel.

Another object is to provide an improved and sturdy locking cap for the filler tube of the fuel tanks for motor vehicles.

A third object is to provide an improved locking cap which may be applied to the standard connection carried by the filler tube of a motor vehicle fuel tank to prevent theft of the fuel.

Yet another object is to provide a locking cap of the character described which is made almost wholly of sheet metal.

Still another object is to provide a locking cap of the character described which is provided with a unitary locking bolt mount and cap fastener lug unit. Other and more specific objects of the invention are mentioned and described herein.

The invention is illustrated in the accompanying drawing, wherein

Figure 1 is a central vertical sectional view through a fuel tank filler tube showing my invention applied thereto and in the locked position;

Fig. 2 is a section taken on line 2—2 of Figure 1;

Fig. 3 is a section taken on line 3—3 of Fig. 1;

Fig. 4 is a plan view similar to Fig. 2 showing the position and relation of the various parts of the locking cap when the cap is initially applied to the filler tube.

Fig. 5 is a vertical sectional view through the top end of a standard filler tube alone of a motor vehicle fuel tank;

Fig. 6 is a perspective of a key controlled tumbler lock which may be used in this invention;

Fig. 7 is a side elevational view of the locking bolt mount with which the cap fastener lugs are formed; and Fig. 8 is a perspective of the same member showing the locking bolt mounted therein.

Similar numerals of reference indicate like parts throughout the several views on the drawing.

Referring now to the details of the drawing the numeral 1 indicates a fuel tank filler tube secured to a fuel tank 2 of a motor vehicle. The filler tube is provided with the usual interior cap securing cams 3 and 4 formed on the lower edges of the opposed, spaced depending flanges 6 and 7 of said tube, said depending flanges and cams being arcuately formed, as is well known in the art. The flanges 6 and 7 of the filler tube terminate at the usual pair of opposed openings 8 and 9 which, as hereinafter described, are adapted to initially receive the fastener lugs of the filler tube cap.

The numeral 10 indicates the locking cap body which may be provided with the annular depending peripheral flange 11, the latter being adapted to encompass the exterior of the filler tube when the cap is applied thereto.

Preferably the cap body 10 and its peripheral flange 11 are formed of ductile sheet metal, and the central portion thereof may be upwardly stamped or drawn into a tubular formation 12 to provide a mount for the key operated lock 13 which may be any suitable type having a rotatable lock barrel 14 mounted therein. The lock barrel 14 of the lock may be provided with a projecting action pin 15, and the lock barrel may be that type which enables the removal of the lock key at either extremity of a half circle movement of said lock barrel.

The numeral 16 indicates a cup-like locking bolt mount which is provided with the opposed integral fastener lugs 17 and 18 extending laterally therefrom and diametrically of the cap, said mount being preferably made of ductile sheet metal and having the integral annular flange 19 formed therewith. The bolt mount 16 is centrally apertured at 20 and is rigidly secured to the inner face of the cap body, by welding, riveting, or otherwise, with the mount opening 20 in registration with the open lower end of the tubular portion 12 of the cap body.

The action pin 15 of the lock barrel 14, which is mounted eccentrically on the latter, projects through the bolt mount opening 20 to the interior of said bolt mount and into operative engagement with a slot 21 formed transversely of and in the relatively flat sheet metal locking bolt 22 for actuation of the latter. The locking bolt 22 is reciprocally mounted in a pair of elongated bearing openings 23 and 24 formed in opposed relation in the bolt mount flange 19 and between the two fastener lugs 17 and 18, whereby the locking bolt is arranged at a substantial angle in relation to the fastener lugs and movable radially of the cap, as hereinafter described. A vent opening 25 may be provided in the cap portion 12 to vent the fuel tank.

The usual gasket 26 may also be provided for the interior of the cap to seal against the upper face of the filler tube.

To apply my improved locking cap to the filler tube 1 and to lock same in position to prevent theft of the fuel in the tank 2 the cap is initially placed over the end of the filler tube with the fastener lugs 17 and 18 disposed in the openings, or interstices 8 and 9, of the arcuate flanges 6 and 7, and partial rotation of the cap is then effected to cause said fastener lugs to engage the cams 3 and 4. This operation of the cap 10 swings the locking bolt 22 into registration with the opening 9 into which said bolt may be actuated by actuation of the action pin 15 of the lock barrel through a half circle, and upon withdrawal of the key from the lock, the bolt 22 is locked in that position. Unauthorized removal of the cap 10 is thereby effectually prevented for the point of the bolt 22 abuts the end of the depending filler tube flange 6, whereby the fastener lugs 17 and 18 are locked in engagement with the cams 3 and 4.

The design and construction of my improved locking cap enables its ready application to the standardized form of the filler tube now generally in use on fuel tanks for motor vehicles without alteration of the filler tube.

In the assembly of the cap body, key lock and the mount 16 the inner end of the lock body 13 preferably projects into the opening 20 with a snug fit to facilitate the assembly of the parts and to effect a more rigid mount of the element 16.

Inasmuch as the ends of the interior flanges 6 and 7, which terminate at the interstices 8 and 9, are of relatively shallow depth it is necessary to mount the locking bolt 22 as close as possible to the cap top 10 to dispose said locking bolt in radial alignment with said flange interstices when the cap is mounted upon the filler tube. To accomplish this, the lock body 13 is elevated above the cap body, the lower end thereof terminating, preferably, above the lock bolt bearing apertures 23 and 24, the latter being arranged in the same transverse plane with the interstices 8 and 9 to enable the arrangement of the bolt 22 in alignment with said interstices. This construction and arrangement of the parts enables the use of a relatively thin, flat sheet metal bolt 22, whereby the cap unit is materially simplified, cheapened, and reduced in weight, and whereby the mount 16, with its lugs 17 and 18, and the bolt 22, are arranged wholly within the cap and above the bottom edge of the cap flange 11. The elevation of the lock 13 above the cap top wall is also efficacious in shedding water and prevents the formation of a pool of water around the upper end of the key barrel of the lock.

I claim:

1. A locking cap of the character described comprising a cup-like cap body, a key operated lock mounted in said cap body and provided with a rotary lock barrel, a one piece sheet metal composite locking bolt mount and cap fastener lug element secured within the cap body and provided with an aperture which is in registration with said lock barrel, said composite element being provided also with a pair of opposed integral apertured bolt bearing flanges and a pair of integral laterally projecting fastener lugs, a unitary locking bolt slidably mounted in the apertures of said bolt bearing flanges, said bolt being provided with a transverse slot, and a pin carried by said lock barrel, said pin projecting into said bolt slot and adapted to reciprocally actuate said bolt upon rotation of said lock barrel.

2. The combination with a filling tube having spaced interior cam elements which effect an interstice therebetween, of a cap body for said filling tube, a unitary locking bolt mount and cap fastener lug unit rigidly fastened to the inner face of said cap body and provided with a substantially central aperture, said unit having a pair of opposed integral fastener lugs projecting therefrom which are adapted to engage said filler tube cam elements upon application of said cap to said filling tube, a locking bolt slidably mounted in said unitary mount unit between said fastener lugs, and lock controlled means carried by said cap body and projecting through said unitary mount unit central aperture for actuating said locking bolt into and out of engagement with said cam element interstice.

3. In a locking mechanism for filler tube caps, the combination with a filler tube provided with spaced interior cam elements which effect an interstice therebetween, of a closure for said filler tube, said closure being provided with an opening therein, a key operated lock mounted in said closure opening, a unitary locking bolt mount and cap fastener lug unit made from a single piece of sheet metal and secured to the inner face of said closure and provided with an aperture which is in registration with the lower end of said lock, said unitary mount unit having opposed integral fastener lugs projecting therefrom and adapted to engage said filler tube cam elements upon application of the closure to said filler tube, said unitary mount unit being provided also with a pair of opposed locking bolt bearings, a locking bolt slidably mounted in said bolt bearings between said fastener lugs, and means operated by said lock and projecting through said unitary mount unit aperture for actuating said locking bolt into and out of engagement with said cam element interstice.

4. In a locking mechanism for filler tube caps, the combination with a filler tube provided with spaced interior cam elements which effect an interstice therebetween, of a closure body for said filler tube, said closure body being provided with an opening, a one piece sheet metal locking bolt mount and closure fastener lug unit rigidly fastened to the inner face of said closure body, said one piece mount and unit having a pair of opposed integral fastener lugs projecting therefrom and adapted to engage said filler tube cam elements when said closure is applied to said filler tube, said one piece bolt mount and unit being provided also with a pair of integral opposed bolt bearing flanges arranged between said fastener lugs, a unitary locking bolt slidably mounted in said bolt bearing flanges, and a key operated lock mounted in said closure opening for actuating said locking bolt into and out of engagement with said cam element interstice.

5. A locking cap of the character described comprising a cup-like cap body, a key operated lock mounted therein and provided with a rotary lock barrel, a one piece sheet metal element rigidly fastened to the inner face of said cap body, said one piece element including opposed outwardly projecting fastener lugs and a pair of integral opposed bolt bearing elements, a unitary radially movable locking bolt mounted in said bearing elements of said one piece sheet metal element, and means for actuating said locking bolt, said means comprising an eccentrically mounted pin on said lock barrel and a slot in said locking bolt which is engaged by said lock barrel pin.

LOUIS C. VANDERLIP.